(12) United States Patent
Ng et al.

(10) Patent No.: US 7,038,837 B2
(45) Date of Patent: May 2, 2006

(54) METHOD FOR DETERMINING LOCATION AND GAIN SETTINGS OF AMPLIFIERS IN AN OPTICAL NETWORK BY USING A GENETIC ALGORITHM

(75) Inventors: Eddie Kai Ho Ng, Ottawa (CA); Colin Geoffrey Kelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 295 days.

(21) Appl. No.: 10/443,955

(22) Filed: May 23, 2003

(65) Prior Publication Data

US 2004/0047026 A1    Mar. 11, 2004

Related U.S. Application Data

(60) Provisional application No. 60/407,986, filed on Sep. 5, 2002.

(51) Int. Cl.
*H01S 3/00* (2006.01)
*H04B 10/00* (2006.01)
*G06F 3/00* (2006.01)

(52) U.S. Cl. .................. 359/333; 398/160; 706/13
(58) Field of Classification Search ............... 359/333; 398/160; 706/13
See application file for complete search history.

(56) References Cited

U.S. PATENT DOCUMENTS 6,424,959 B1 *  7/2002  Bennett et al. ............... 706/13
2002/0187770 A1 * 12/2002 Grover et al. .............. 455/403

OTHER PUBLICATIONS

Abed et al. Optimizing Logical Topology of Lightwave Network Architecture (LNA) Using Genetic Algorithms. Computers and Communications. Mar. 27-29, 1996. pp. 501-507.*
Zhong et al. Optimization of Amplifier Placements in Switch-Based Optical Networks. Communications, 2001. Jun. 11-14, 2001. pp. 224-228. vol. 1.*
Efimov et al. Minimizationof dispersion in ultrafast chirped pulse amplifier using adaptive learning. Appl. Phys. B70 [Suppl.]S133-S141. 2000.*
Yang et al. A Genetic Algorithm-Based Methodology for Optimizing Multiservice Convergence in a Metro WDM Network. Journal of Lightwave Technology, vol. 21, No. 5, May 2003.*

(Continued)

*Primary Examiner*—Deandra M. Hughes
(74) *Attorney, Agent, or Firm*—Victoria Donnelly

(57) ABSTRACT

A method for determining locations and gain settings of amplifiers in an optical network is provided. The method comprises evaluating allowable amplifier locations, randomly generating sets of amplifier locations from the allowable amplifier locations, and applying genetic operations to the sets of amplifier locations until a predetermined exit condition is satisfied. This systematic method is applicable to a variety of network topologies and takes into account existing network limitations. In one embodiment, the method for determining the locations and gain settings of the amplifiers uses the amount of operating margin in the network to select sets of locations to be eliminated. In another embodiment, the method takes into account and determines the placement of dispersion compensation modules (DCMs), choices of which are provided by DCM placement procedures.

14 Claims, 6 Drawing Sheets

OTHER PUBLICATIONS

Ramamurthy, B., et al, "Minimizing the Number of Optical Amplifiers Needed to Support a Multi-Wavelength Optical LAN/MAN", Proceedings of IEEE INFOCOM '97, pp. 261-268, 1997.

Li, Chung-Sheng, et al, "Gain Equalization in Metropolitan and Wide Area Optical Networks Using Optical Amplifiers", Proceedings of IEEE INFOCOM '94, pp. 130-137, 1994.

Ramamurthy, B., et al, "Optimizing Amplifier Placements in a Multiwavelength Optical LAN/MAN: The Equally Powered-Wavelengths Case", Journal of Lightwave Technology, vol. 16, pp. 1560-1569, Sep. 1998.

Fumagalli, A., et al, "Optimal Amplifier Placement in Multi-Wavelength Optical Networks Based on Simulated Annealing", Proceedings of the SPIE—The International Society for Optical Engineering, vol. 3531, pp. 268-279, 1998.

Ramamurthy, B., et al, "Optimizing Amplifier Placements in a Multi-Wavelength Optical LAN/MAN: The Unequally Powered Wavelengths Case", IEEE/ACM Transactions on Networking, pp. 755-767, Dec. 1998.

Fogel, David B., "An Introduction to Simulated Evolutionary Optimization", IEEE Transactions on Neural Networks, vol. 5, No. 1, pp. 3-14.

* cited by examiner

| Amplifier location | | | | | | | | | | | | | | assigned value |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | |
| 1 | 0 | 1 | 0 | 1 | 1 | 0 | 0 | 0 | 1 | 0 | 0 | 1 | 1 | 2.7 |
| 1 | 1 | 0 | 0 | 0 | 0 | 0 | 0 | 0 | 1 | 1 | 0 | 0 | 0 | 1.9 |
| 0 | 0 | 1 | 1 | 0 | 0 | 1 | 1 | 0 | 0 | 1 | 0 | 0 | 1 | 3.6 |
| 1 | 0 | 1 | 1 | 0 | 0 | 0 | 1 | 0 | 1 | 0 | 0 | 0 | 1 | 2.2 |
| 1 | 1 | 0 | 1 | 1 | 0 | 0 | 0 | 0 | 1 | 0 | 0 | 1 | 1 | 2.0 |
| 0 | 1 | 1 | 1 | 1 | 0 | 1 | 0 | 1 | 1 | 0 | 0 | 1 | 1 | 4.4 |
| 0 | 0 | 0 | 1 | 0 | 0 | 1 | 0 | 1 | 1 | 0 | 1 | 1 | 0 | 0.0 |
| 1 | 0 | 1 | 0 | 1 | 1 | 1 | 1 | 1 | 0 | 1 | 1 | 1 | 1 | 4.0 |
| 0 | 0 | 0 | 1 | 1 | 0 | 0 | 0 | 0 | 1 | 0 | 0 | 1 | 0 | 0.1 |
| 1 | 0 | 0 | 1 | 0 | 1 | 0 | 0 | 0 | 0 | 0 | 1 | 1 | 1 | 0.8 |
| 1 | 0 | 1 | 1 | 0 | 1 | 0 | 0 | 1 | 0 | 0 | 1 | 1 | 1 | 3.4 |
| 0 | 0 | 0 | 1 | 0 | 1 | 1 | 0 | 0 | 1 | 1 | 0 | 1 | 1 | 0.1 |
| 1 | 0 | 1 | 0 | 1 | 0 | 1 | 0 | 1 | 0 | 1 | 0 | 1 | 1 | 4.8 |
| 1 | 0 | 1 | 1 | 0 | 1 | 0 | 1 | 0 | 1 | 0 | 1 | 0 | 0 | 5.0 |

Fig. 3

| Amplifier location | | | | | | | | | | | | | | assigned value |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | |
| 1 | 0 | 1 | 0 | 1 | 1 | 0 | 1 | 0 | 1 | 0 | 1 | 0 | 0 | 5.0 |
| 1 | 0 | 1 | 0 | 1 | 1 | 0 | 1 | 0 | 1 | 0 | 0 | 1 | 1 | 4.4 |
| 1 | 1 | 1 | 0 | 1 | 1 | 0 | 1 | 0 | 1 | 0 | 0 | 1 | 1 | 3.8 |
| 1 | 0 | 1 | 0 | 1 | 1 | 0 | 1 | 0 | 1 | 1 | 1 | 1 | 0 | 3.8 |
| 1 | 0 | 1 | 0 | 1 | 1 | 0 | 1 | 0 | 1 | 0 | 0 | 1 | 1 | 3.8 |
| 1 | 0 | 1 | 1 | 1 | 0 | 1 | 0 | 1 | 1 | 0 | 0 | 1 | 1 | 3.4 |
| 1 | 0 | 1 | 0 | 1 | 1 | 0 | 1 | 1 | 0 | 1 | 1 | 1 | 1 | 2.6 |
| 1 | 0 | 1 | 1 | 1 | 1 | 0 | 1 | 0 | 1 | 0 | 0 | 0 | 1 | 2.4 |
| 1 | 0 | 1 | 1 | 1 | 0 | 1 | 0 | 1 | 1 | 0 | 0 | 0 | 1 | 0.5 |
| 1 | 0 | 1 | 0 | 1 | 1 | 0 | 0 | 0 | 1 | 0 | 0 | 0 | 0 | 0.0 |
| 1 | 0 | 1 | 0 | 1 | 1 | 0 | 0 | 0 | 1 | 1 | 0 | 0 | 0 | 0.0 |
| 1 | 0 | 1 | 0 | 1 | 1 | 0 | 0 | 0 | 1 | 1 | 0 | 0 | 0 | 0.0 |
| 1 | 0 | 1 | 0 | 1 | 1 | 0 | 0 | 0 | 1 | 0 | 0 | 0 | 1 | 0.0 |
| 1 | 0 | 1 | 0 | 1 | 1 | 0 | 0 | 0 | 1 | 0 | 0 | 0 | 1 | 0.0 |
| 1 | 0 | 1 | 0 | 1 | 1 | 0 | 0 | 0 | 1 | 0 | 0 | 0 | 1 | 0.0 |

Fig. 4

METHOD FOR DETERMINING LOCATION AND GAIN SETTINGS OF AMPLIFIERS IN AN OPTICAL NETWORK BY USING A GENETIC ALGORITHM

RELATED APPLICATIONS

This application claims priority from U.S. Provisional Patent Application to Ng et al. entitled "Method of Placement of an Amplifier in an Optical Network", Ser. No. 60/407,986 filed on 5 Sep. 2002; and is related to U.S. patent applications to Ng et al., entitled "Method for Determining Optimal Location and Value of Dispersion Compensating Modules in an Optical Network", filed concurrently herewith; and U.S. patent application Ser. No. 10/273,858 filed on 21 Oct. 2002, entitled "Method and System for Determining Location and Value of Dispersion Compensating Modules in an Optical Network".

FIELD OF THE INVENTION

The present invention relates generally to optical networks, and in particular to a method for determining locations and gain settings of amplifiers in optical networks.

BACKGROUND OF THE INVENTION

As development of long-haul networks begins to saturate and the demand for larger bandwidth in the networks starts to expose bottlenecks at the user-end, the focus of optical network development has shifted away from long-haul networks to smaller and more dynamic networks, such as metropolitan area networks (MANs). As a result, new network design and planning rules, for example, related to the placement of network components, have to be developed.

Specifically, determining the locations and gain settings of optical amplifiers in MANs is a new design issue that has arisen since the growth in the size of MANs has reached the degree that amplification has become necessary in MANs. However, many of the current amplifier placement methods do not attempt to optimize network parameters such as cost associated with amplifiers or optical signal to noise ratio (OSNR) of signals. As well, many amplifier placement methods are specific to a particular network topology, such as star or ring topologies, and cannot be applied to the more complex mesh topology.

For example, there exist methods of determining amplifier placement that are simple and methodical, as illustrated by the following two examples.

An article by Byrav Ramamurthy, Jason Iness, and Biswanath Mukherjee published in Proceedings of IEEE INFOCOM '97, pages 261–8, 1997 and entitled "Minimizing the Number of Optical Amplifiers Needed to Support a Multi-Wavelength Optical LAN/MAN" discloses two methods of determining amplifier placement, one termed the As Soon As Possible (ASAP) method, and the other termed the As Late As Possible (ALAP) method. Amplifier placement is determined solely by power levels along optical links in the network.

An article by Chung-Sheng Li, Franklin Fuk-Kay Tong, Christos J. Georgiou, and Monsong Chen published in Proceedings of IEEE INFOCOM '94, pages 130–7, 1994 and entitled "Gain Equalization in Metropolitan and Wide Area Optical Networks Using Optical Amplifiers" discloses a method of determining amplifier placement in the network by traversing the network in an upstream direction and placing amplifiers to maintain power levels at specific locations in the network.

These two methods described above do not attempt to minimize the number of amplifiers in the network, nor do they perform an assessment of the effectiveness of particular amplifier locations for the network as a whole.

Advanced methods of determining amplifier placement in a network involve formulating a mathematical equation for the amplifier placement and solving the equation, as is illustrated by the following three methods.

An article by Byrav Ramamurthy, Jason Iness, and Biswanath Mukherjee published in Journal of Lightwave Technology, volume 16, pages 1560–9, September 1998 and entitled "Optimizing Amplifier Placements in a Multiwavelength Optical LAN/MAN: The Equally Powered-Wavelengths Case" discloses a method of determining the minimum number and locations of optical amplifiers required in a network by solving the amplifier placement equation with a mixed-integer linear program (MILP) software package. This method is applicable only to star coupler-based networks and assumes the artificial constraint that the powers on the wavelengths at any given point in the network are equal.

An article by A. Fumagalli, G. Balestra, and L. Valcarenghi published in Proceedings of the SPIE—The International Society for Optical Engineering, volume 3531, pages 268–79, 1998 and entitled "Optimal Amplifier Placement in Multi-Wavelength Optical Networks Based on Simulated Annealing" discloses a method of determining the placement of optical amplifiers required in a network by solving the amplifier placement equation with a heuristic algorithm. This method is applicable only to broadcast-and-select networks.

An article by Byrav Ramamurthy, Jason Iness, and Biswanath Mukherjee published in IEEE/ACM Transactions on Networking, pages 755–67, December 1998 and entitled "Optimizing Amplifier Placements in a Multi-Wavelength Optical LAN/MAN: The Unequally-Powered-Wavelengths Case" discloses a method of determining the minimum number and locations of optical amplifiers required in a network by solving the amplifier placement equation with a nonlinear solver. This method is applicable only to star coupler-based networks.

In the above-mentioned methods, optical amplifier placements are unrestricted so that an optical amplifier may be placed at any location along the lightpaths of the network. In practice though, optical amplifiers often have to be placed into existing optical networks, and thus there exists the added constraint that optical amplifiers may only be placed at easily accessible locations along the lightpaths of the network. The above-mentioned methods do not take such constraints into account.

Therefore, there is a need in the industry for the development of a method and system for determining the locations and gain settings of optical amplifiers in an optical network that is applicable to a variety of network topologies and takes into account additional factors and existing network limitations such as amplifier cost and location restrictions.

SUMMARY OF THE INVENTION

Therefore there is an object of the invention to provide a method for determining the locations and gain settings of optical amplifiers in an optical network that would avoid or minimize the above-mentioned drawbacks.

According to one aspect of the invention, there is provided a method for determining the location of one or more optical amplifiers in an optical network, comprising:

(a) determining allowable locations for amplifiers in a network;

(b) randomly generating sets of amplifier locations for the network, each set being generated by randomly choosing amplifier locations from among said allowable locations;

(c) applying genetic operations to said sets of randomly generated amplifier locations, the genetic operations resulting in genetically evolved sets of amplifier locations;

(d) eliminating genetically evolved sets of amplifier locations by applying an elimination criteria;

(e) repeating steps (c) to (d) until a predetermined exit condition is satisfied; and (f) selecting a set of amplifier locations out of the sets of amplifier locations remaining in the step (e), which satisfies a selection criteria.

Additionally the step of applying genetic operations may include the steps of:

reproducing identical copies of the sets of amplifier locations (reproduction);

exchanging subsets of different sets of amplifier locations (crossover); and randomly adding and removing amplifier locations in the sets of amplifier locations (mutation).

Furthermore, the step of randomly choosing amplifier locations from among said allowable locations may comprise applying a random binary value to each allowable amplifier location.

Beneficially, the step of eliminating may comprise assigning a value to each set of the genetically evolved sets of amplifier locations and may comprise eliminating those genetically evolved sets of amplifier locations that have lowest assigned values. Moreover, the step (f) of selecting a set of amplifier locations may comprise selecting the set of amplifier locations having the largest assigned value.

The step of assigning a value to each set of the genetically evolved sets of amplifier locations may comprise the steps of:

(g) selecting a set of amplifier locations from among the sets of genetically evolved sets of amplifier locations;

(h) determining if desired network operating conditions can be met by adjusting network and amplifier parameters in the network having amplifiers at the selected set of amplifier locations;

(j) assigning the value for said selected set of amplifier locations, the value depending on the network and amplifier parameters and on the result of determining if desired network operating conditions can be met; and (k) repeating the steps (g) to (j) a number of times.

The step (h) of determining network and amplifier parameters may comprise determining signal powers in the network and gain settings for said amplifiers such that the powers of signals on different wavelengths at said amplifiers are equal.

The step (j) of assigning the value may comprise calculating the value so as to be equal to a function of one or more of the following:

the number of lightpaths in the network having amplifiers at locations specified in the step (g) that meet predetermined specifications, wherein a lightpath is a route from a transmitter to a receiver;

the number of amplifier locations in said selected set of amplifier locations specified in the step (g);

the effective margin of said selected set of amplifier locations, the effective margin being an available operating margin in the network having amplifiers in said selected set of amplifier locations, the operating margin in the network being a difference between an operating value of a selected network parameter and a threshold value of said parameter for the network; and a value representing whether the desired network operating conditions can be met as determined in the step (h).

The step of calculating the assigned value may comprise defining the predetermined specifications of the lightpaths to be one or more of the following:

a minimum optical signal to noise ratio (OSNR);

a minimum signal power level; and a maximum signal error rate.

Also, the step of calculating the assigned value may comprise determining the effective margin as a function of one of the following:

an optical signal to noise ratio (OSNR) margin ($OSNR_{margin}$);

a power margin ($P_{rx\ margin}$); and the optical signal to noise ratio (OSNR) margin ($OSNR_{margin}$) and the power margin ($P_{rx\ margin}$), for example $\sqrt{(P_{Rxmargin})^2 + (OSNR_{margin})^2}$.

In addition, the step (e) of repeating may comprise determining the predetermined exit condition as the state in which a percentage of the genetically evolved sets of amplifier locations are the same.

Moreover, the step (a) of determining allowable locations may comprise determining allowable locations for amplifiers in the network, which includes protection lightpaths and reconfigurable lightpaths.

According to another aspect of the invention, there is provided a method for determining the location of one or more optical amplifiers in an optical network, comprising the steps of:

(a) determining allowable locations for amplifiers and dispersion compensation modules (DCMs) in a network;

(b) randomly generating sets of amplifier and DCM locations for the network, each set being generated by randomly choosing amplifier and DCM locations from among said allowable locations;

(c) applying genetic operations to said sets of randomly generated amplifier and DCM locations, the genetic operations resulting in genetically evolved sets of amplifier and DCM locations;

(d) eliminating genetically evolved sets of amplifier and DCM locations by applying an elimination criteria;

(e) repeating steps (c) to (d) until a predetermined exit condition is satisfied; and (f) selecting a set of amplifier and DCM locations out of the sets of amplifier and DCM locations remaining in the step (e), which satisfies selection criteria.

The methods for determining the locations and gain settings of optical amplifiers in an optical network of the embodiments of the invention provide a systematic procedure that is applicable to a variety of network topologies, optimizes the placement of amplifiers, and takes into account additional factors and existing network limitations such as amplifier location restrictions.

BRIEF DESCRIPTION OF THE DRAWINGS

Embodiments of the invention will now be described, by way of example, with reference to the accompanying drawings in which:

FIG. 3 shows a table of sets of amplifier locations of the optical network of FIG. 1 randomly generated in the step 204 of FIG. 2;

FIG. 4 shows a table of genetically evolved sets of amplifier locations of the optical network of FIG. 1 resulting from the step 206 of FIG. 2;

DETAILED DESCRIPTION OF PREFERRED EMBODIMENTS

Figure 1:
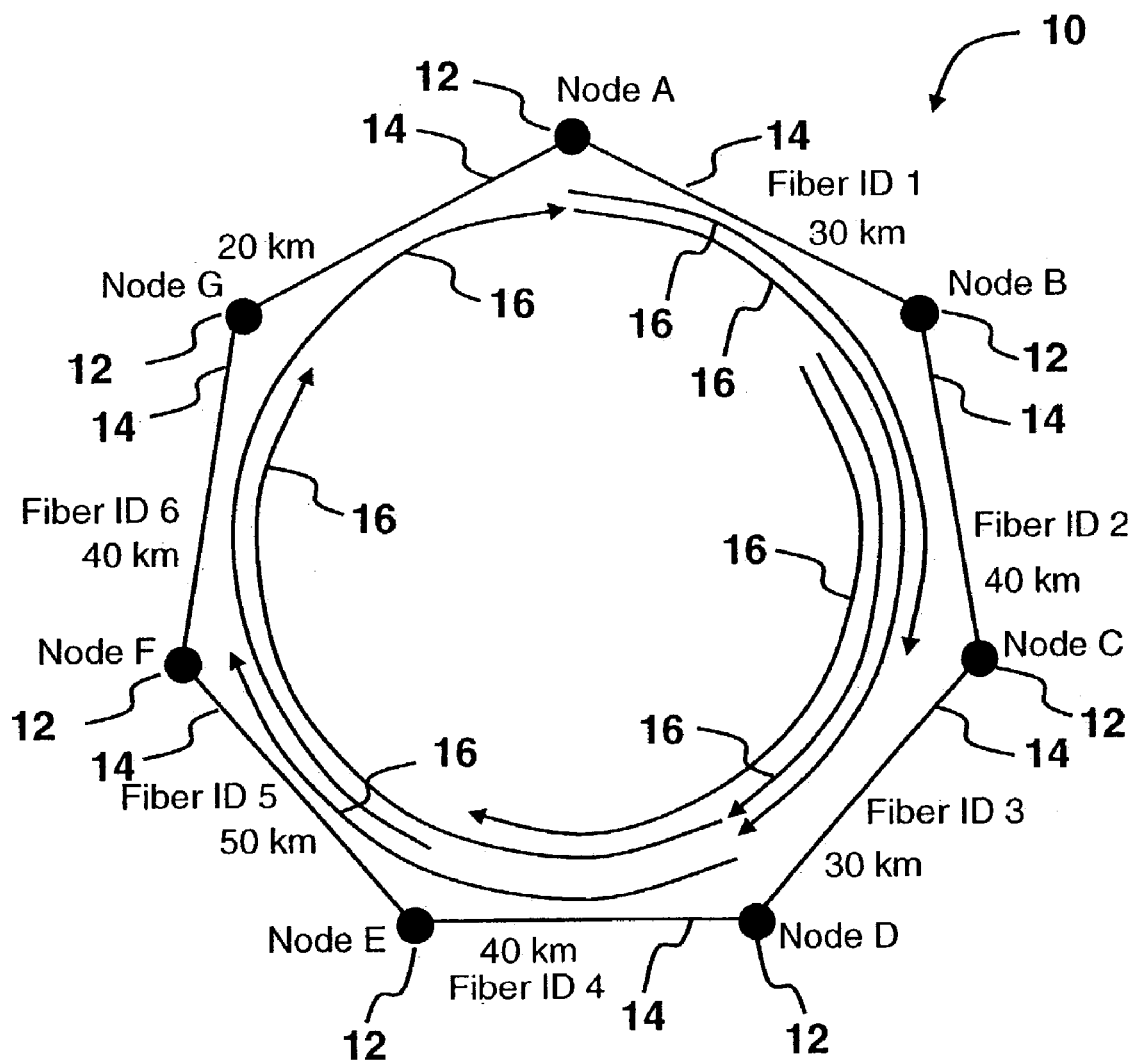
FIG. 1 is an exemplary optical network used for illustrating methods for determining the locations and gain settings of optical amplifiers according to the embodiments of the invention.

An exemplary optical network 10 is illustrated in FIG. 1 as comprising a plurality of, in this example seven, nodes 12 identified individually as Nodes "A" through "G" (namely, nodes "A", "B", "C", "D", "E", "F", "G"), which are connected together via fiber spans 14 identified individually by the fiber identification numbers (IDs) "1" through "7" and represented by straight solid lines. Lightpaths 16 are represented by curved solid lines with arrows indicating the direction of a network signal traveling from a source node to a destination node.

As is known in the art, such an optical network may include an arbitrary number of nodes 12 and lightpaths 16, and each of the fiber spans 14 may have different lengths and thus different dispersions. Also, such an optical network 10 may have other arrangements of nodes 12 and other lightpaths 16 through the nodes 12, such as mesh or star topologies. Accordingly, FIG. 1 serves merely to illustrate one form of optical network for the purpose of describing embodiments of the invention.

Figure 2:
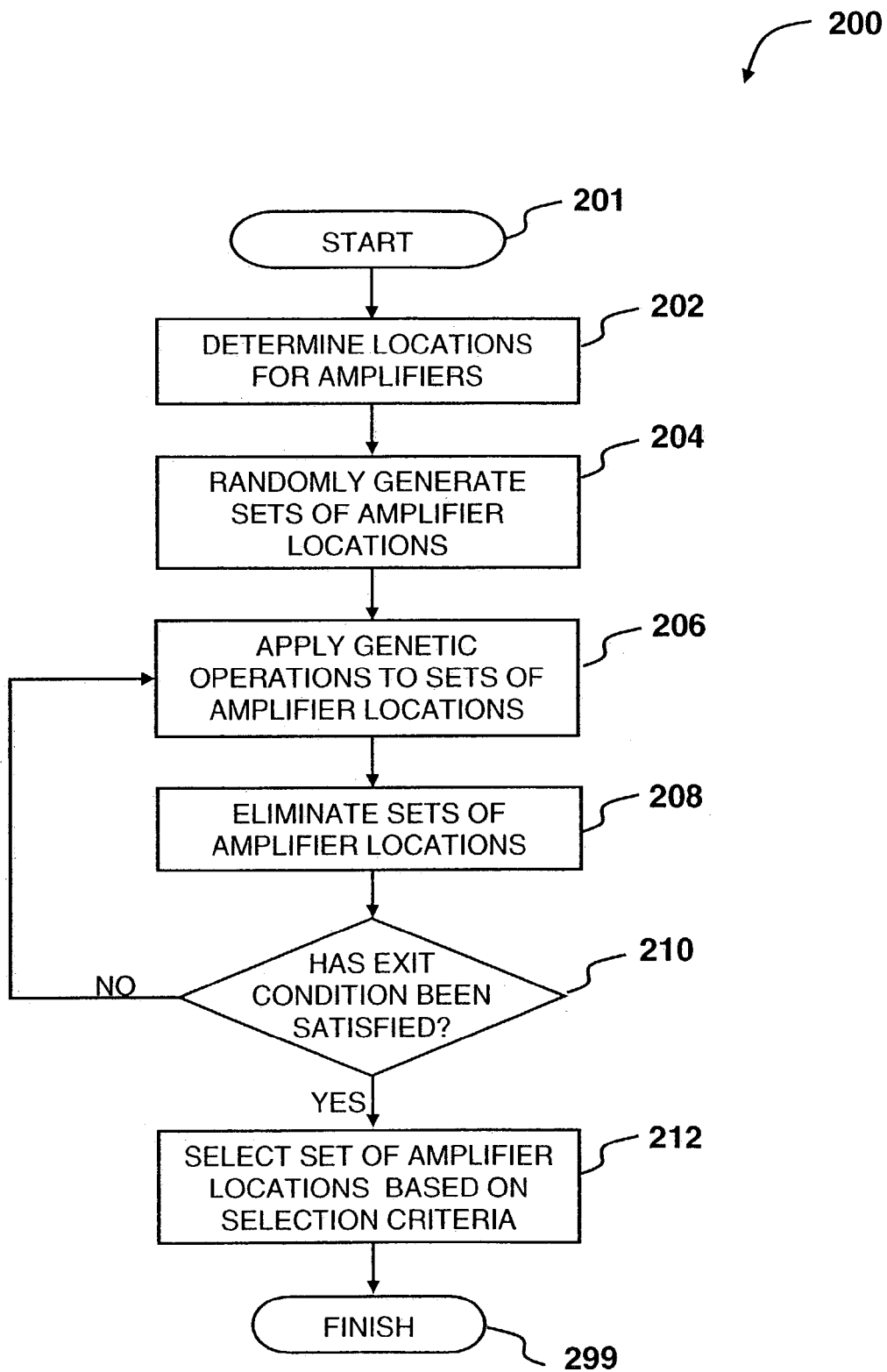
FIG. 2 is a flowchart illustrating the steps of the method for determining the locations and gain settings of optical amplifiers according to a first embodiment of the invention.

FIG. 2 is a flowchart 200 illustrating the steps of the method for determining the location of amplifiers in the optical network 10 according to the first embodiment of the invention.

Upon start 201, the procedure 200 determines the allowable locations for amplifiers in the network (step 202). Allowable locations are those locations where optical amplifiers may be placed, and they may be determined, for example, based on the ease of accessibility to the locations. Central offices and amplifier huts are generally allowable locations for amplifiers in the network 10.

After determining the allowable locations for amplifiers (step 202), the flowchart 200 proceeds with randomly generating sets of amplifier locations for the network 10 (step 204), each set being generated by randomly choosing amplifier locations from among the allowable locations determined in the step 202. Each set may be denoted by, for example, a binary series of ones and zeros associated with the allowable locations, the ones denoting an allowable location where an amplifier is to be placed and a zero denoting an allowable location where an amplifier is not to be placed.

In the step 206, the procedure 200 applies genetic operations to the sets of amplifier locations generated in the step 204, the genetic operations resulting in genetically evolved sets of amplifier locations. The genetic operations include the following:

reproduction, in which identical copies of the sets of amplifier locations are generated;

crossover, in which subsets of different sets of amplifier locations are exchanged; and mutation, in which a random location in a set of amplifier locations is added or removed, for example by changing an entry of the binary series denoting the allowable locations from a one to a zero or vice versa.

An article by David B. Fogel published in IEEE Transactions on Neural Networks, volume 5, number 1, pages 3–14, January 1994 and entitled "An Introduction to Simulated Evolutionary Optimization" provides a review of genetic algorithms and associated chromosomal operators as applied to optimization problems.

The procedure 200 then eliminates genetically evolved sets of amplifier locations (step 208) by applying an elimination criteria. This step includes assigning a value to each set of genetically evolved sets of amplifier locations, as will be further described below. The elimination criteria then may be, for example, that the procedure 200 eliminate those sets of amplifier locations whose assigned values are the lowest.

In the step 210, the procedure 200 checks whether a predetermined exit condition has been satisfied. The predetermined exit condition may be, for example, that a certain percentage of the sets of amplifier locations are the same. If the predetermined exit condition has not been satisfied (exit "No" from the step 210), then the method 200 returns to the step 206 of applying genetic operations.

If the predetermined exit condition has been satisfied (exit "Yes" from the step 210), then the method 200 proceeds to the step 212 of selecting the set of amplifier locations that satisfies a selection criteria, and the method 200 is finished (step 299). In the step 212, the procedure 200 may, for example, select the set of amplifier locations with the largest assigned value.

Figure 2A:
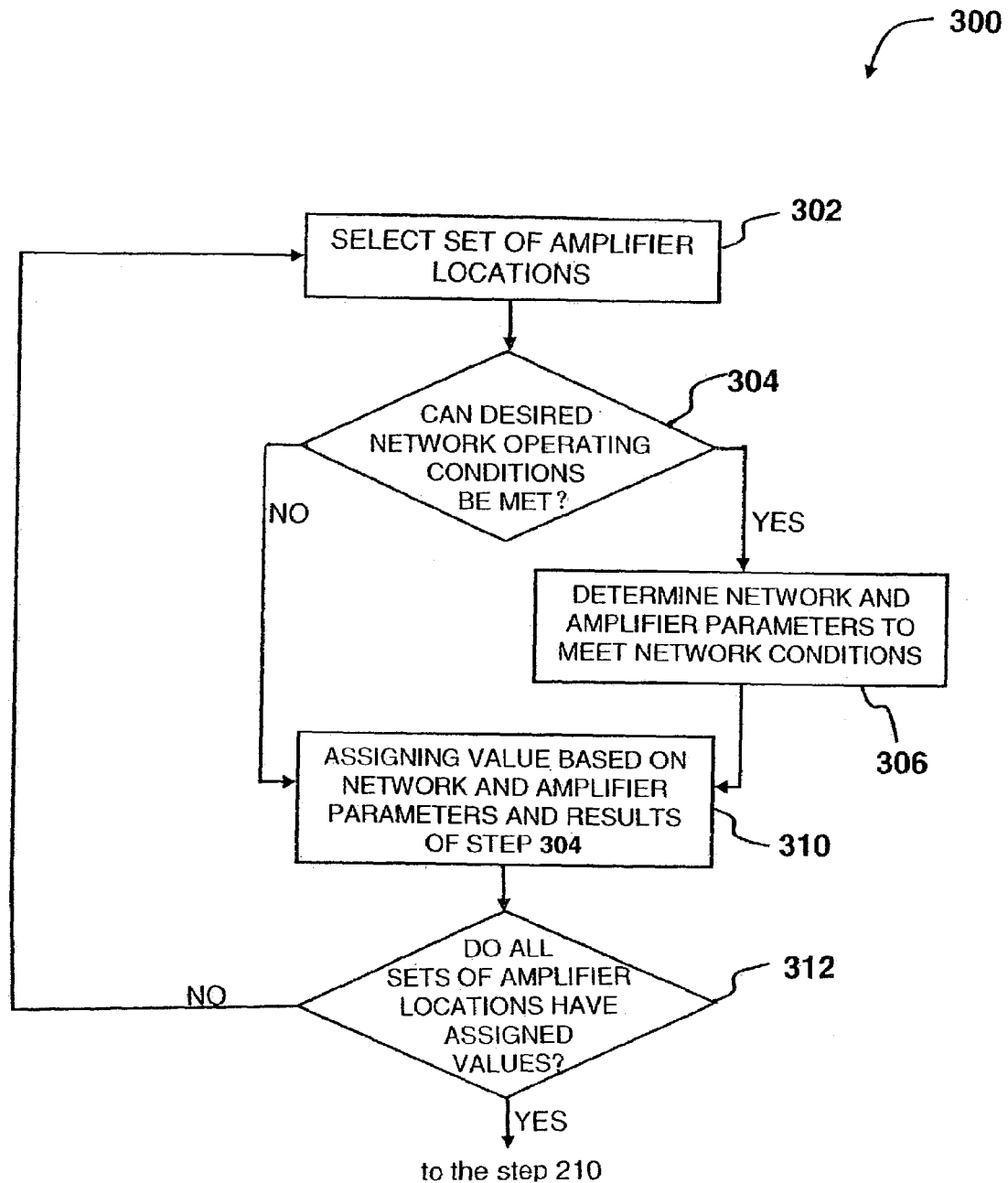
FIG. 2A is a flowchart illustrating part of the step 208 of eliminating sets of amplifier locations in the method of FIG. 2 in more detail.

As mentioned previously, the step of eliminating genetically evolved sets of amplifier locations (step 208) includes assigning a value to each of the sets. FIG. 2A is a flowchart 300 illustrating the steps of assigning the value to each set of genetically evolved sets of amplifier locations. It comprises selecting a set of amplifier locations (step 302) from among the sets of genetically evolved sets of amplifier locations, determining if desired network operating condition can be met (step 304) by adjusting network and amplifier parameters of the network having amplifiers at the selected set of amplifier locations, if yes, then determining the network and amplifier parameters that ensure the desired network operating conditions (step 306), followed by calculating the assigned value of the selected set of amplifier locations (step 310) based on the network and amplifier parameters determined in the step 306 and results ("Yes" or "No") in the step 304. If desired network operating conditions cannot be met (exit "No" from box 304), the procedure 300 goes directly to step 310, followed by checking whether all sets of amplifier locations have had values assigned to them (step 312), and repeating the steps 302 to 312 until all sets of amplifier locations have had values assigned to them.

The network and amplifier parameters may be, for example, signal powers in the network and gain settings for the amplifiers that ensure that the powers of signals on different wavelengths at the amplifiers are equal.

The assigned value calculated in the step 310 is defined to measure how well the selected set of amplifier locations achieves a certain network aim. For example, if the aim is to minimize the number of amplifiers in the network 10, then the assigned value will be larger for a set with fewer amplifier locations. The assigned value may be, for example, a function of:

the number of lightpaths 16 PP in the network 10 having amplifiers at the locations specified in the step 302 that meet predefined specifications, such as a minimum optical signal to noise ratio (OSNR), a minimum signal power level, or a maximum signal error rate, wherein a lightpath is a route from a transmitter to a receiver;

the number of amplifier locations $N_{amp}$ in the selected set of amplifier locations specified in the step 302;

the effective margin EM of the selected set of amplifier locations, as further described below; and a value cond_met representing whether the desired network operating conditions can be met as determined in the step 304.

The effective margin EM is the available operating margin in the network having amplifiers at the selected set of amplifier locations. The operating margin in the network is a difference between an operating value of a selected network parameter and a threshold value of said parameter for the network. The effective margin may be defined as, for example, the average OSNR margin ($OSNR_{margin}$) or the average power margin ($P_{rx\ margin}$) of the network, or a function of both of these values, such as $\sqrt{(P_{Rxmargin})^2 + (OSNR_{margin})^2}$.

It is implicitly implied that the selected set of amplifier locations of the step 212 is checked to ensure that all lightpaths in the network having amplifiers at the selected set of locations meet predetermined specifications. This is accomplished by checking that the number of lightpaths PP that meet predefined specifications is equal to the total number of lightpaths 16 in the network 10. If all lightpaths do not meet predetermined specifications, then the method 200 returns no set of amplifier locations. The method also returns no set of amplifier locations if the step 210 of checking whether a predetermined exit condition has been satisfied is repeated a maximum allowed number of times. This ensures that the method 200 will exit.

The method of the first embodiment of the invention is applied to the exemplary optical network 10. Upon start 201, the procedure 200 determines the allowable locations for amplifiers in the network 10 (step 202). In this example, there are 14 allowable amplifier locations, namely the source and destination ends of each of the 7 fiber spans 14, hereby referred to as "1", "2", "3", "4", "5", "6", "7", "8", "9", "10", "11", "12", "13", and "14".

The procedure 200 then randomly generates sets of amplifier locations for the network 10 (step 204). It is implicitly implied that a value is assigned to each set of amplifier locations upon its initial generation according to the same calculation as in the step 310. FIG. 3 shows a table 30 of 14 sets of amplifier locations of the optical network 10 of FIG. 1 randomly generated in the step 204 of FIG. 2. Each row in the table 30 corresponds to a set of amplifier locations and is denoted by a binary series of ones and zeros associated with the allowable locations, the ones denoting an allowable location where an amplifier is to be placed and a zero denoting an allowable location where an amplifier is not to be placed. For example, the first row of the table 30 in FIG. 3 is a set of amplifier locations corresponding to the allowable amplifier locations "1", "3", "5", "6", "10", "13", and "14".

The value 32 assigned to each set of amplifier locations is shown in the right-most column of table 30. In this example, the assigned value 32 is calculated as:

$$\text{assigned value} = m_1 \times PP - 6N_{amp} + EM_{max}(1-PP) + EM(2PP-1) + EM_{max}(1-PP) + \text{cond\_met} \times EQ_{max}$$

where $m_1 = 0.5 \times \text{Pop\_num}$, $EM = \sqrt{(P_{Rxmargin})^2 + (OSNR_{margin})^2}$, $EM_{max} = 0.15 \times \text{Pop\_num}$, $EQ_{max} = -0.05 \times \text{Pop\_num}$, and Pop_num is the number of sets of amplifier locations. The assigned values are then scaled from zero to five over the sets of amplifier locations.

The procedure 200 then applies genetic operations (step 206) to the sets of amplifier locations generated in the step 204. Each set of amplifier locations is first reproduced a number of times equal to its assigned value 32 rounded to the nearest integer. Then crossover is performed on each set by exchanging randomly chosen subsets with a different randomly chosen set of amplifier locations. Finally, mutation is performed on five percent of the entries of each set of amplifier locations by changing binary values from one to zero or zero to one.

Then, the sets of amplifier locations with the lowest assigned values are eliminated (step 208) leaving the 14 sets of amplifier locations with the largest assigned values. The result is the table 40 of sets of amplifier locations illustrated in FIG. 4.

In the step 210, the procedure 200 checks whether the exit condition has been satisfied. In this example, the exit condition is the condition that all remaining 14 sets of amplifier locations from the step 208 are the same. In the table 40, not all the rows are the same so the procedure will exit "No" from the step 210 and return to the step 206 of applying genetic operations to the sets of amplifier locations.

Figure 5:
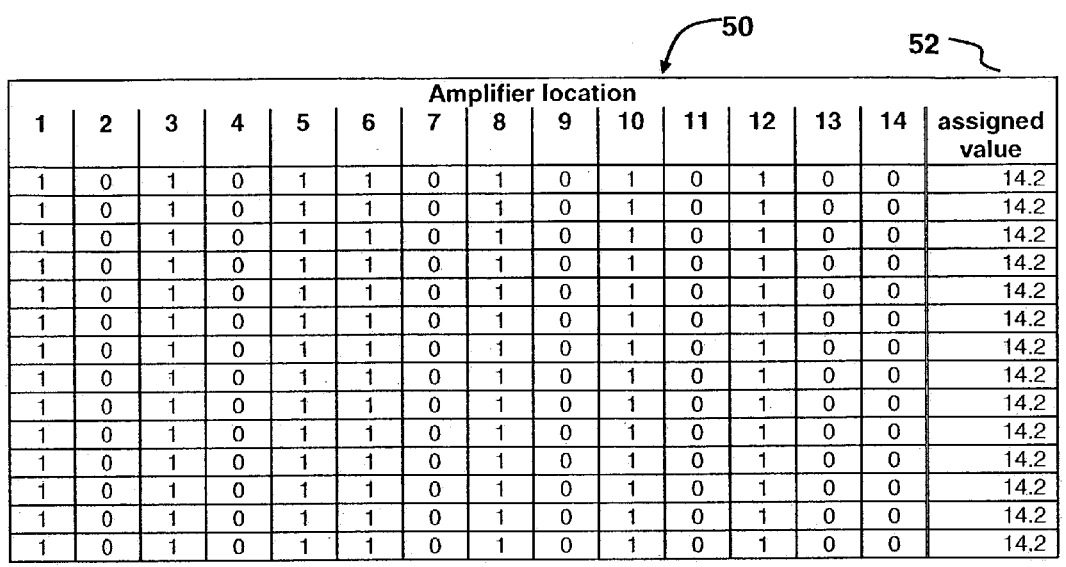
FIG. 5 shows a table of sets of amplifier locations of the optical network of FIG. 1 that satisfy the exit condition of the step 210 of FIG. 2.

The steps 206 to 210 are repeated until the exit condition is satisfied, as illustrated in table 50 of FIG. 5. In the table 50, the assigned values 52 were not scaled from zero to five because they are all the same.

When the exit condition is satisfied, the procedure 200 exits "Yes" from the step 210 and proceeds to the step 212 of selecting the set of amplifier locations with the largest assigned value and the method is finished (step 299). Thus, for this example the selected amplifier locations are "1", "3", "5", "6", "8", "10", and "12".

Thus, a method for determining the location and value of amplifiers in an optical network is provided that is systematic, expeditious, is applicable to a variety of network topologies, and takes into account existing network limitations.

This method may also be applied to bidirectional networks in which nodes are connected by two spans of fiber, each fiber span carrying a network signal traveling in opposite directions. These two fiber spans between nodes may be of different lengths, so that the amplifier placement method must be performed twice, once on the network that carries signals traveling in one direction, and once on the network that carries signals traveling in the opposite direction.

Furthermore, this method may be applied to protected networks having additional fiber spans forming protection lightpaths between nodes, and to reconfigurable networks having multiple reconfigurable lightpaths between nodes. In the step 202, the protection lightpaths and the reconfigurable lightpaths are included along with the working lightpaths when determining locations for amplifiers in the network. Thus the method ensures that all lightpaths, including the protected lightpaths and reconfigurable lightpaths, meet network operating conditions.

According to a second embodiment of the invention, the method is modified to include placement of dispersion compensation modules (DCMs) to improve amplifier placement.

Figure 6:
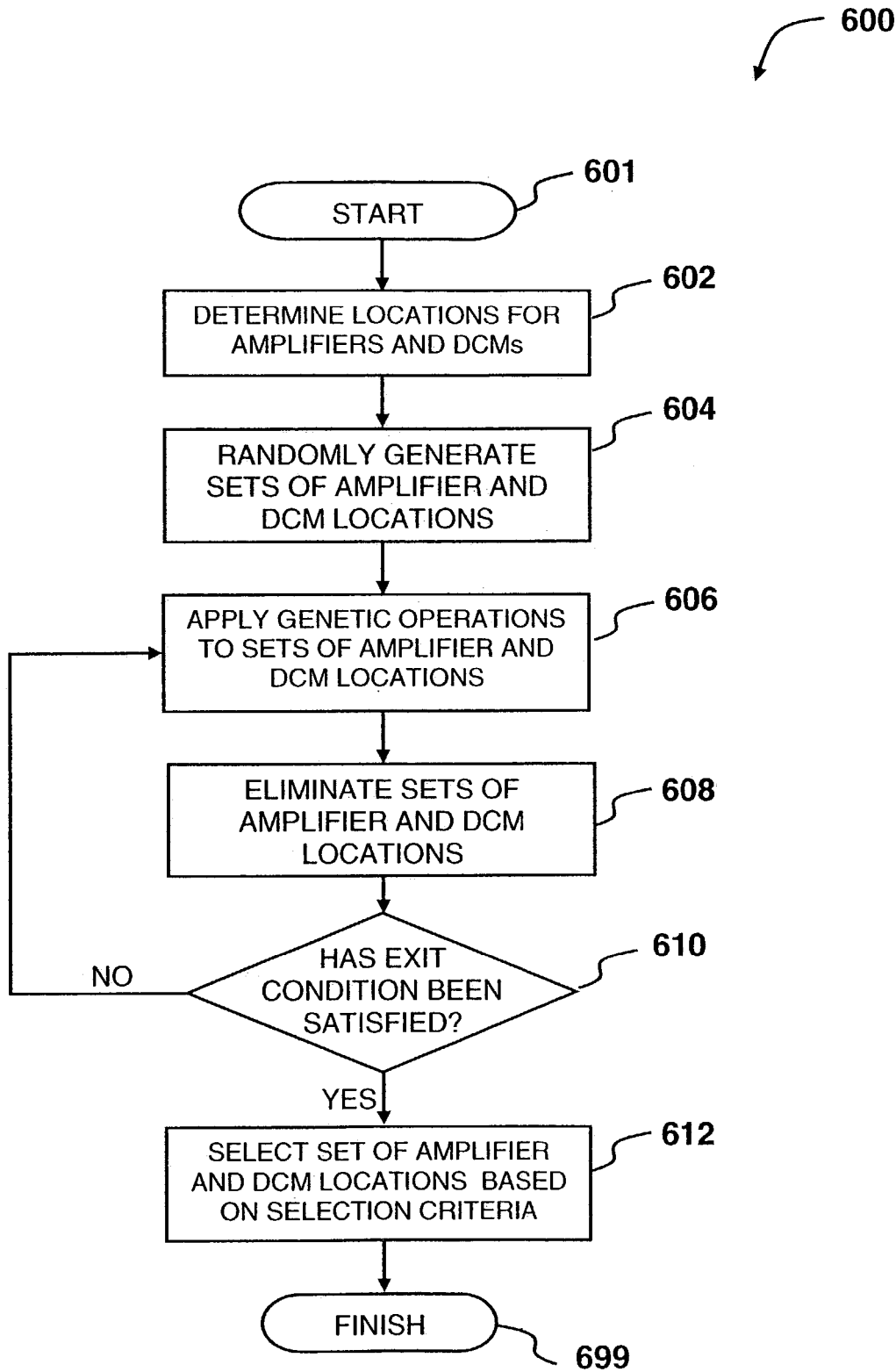
FIG. 6 is a flowchart illustrating the steps of the method for determining the locations and gain settings of optical amplifiers according to a second embodiment of the invention.

FIG. 6 is a flowchart 600 illustrating the steps of the method for determining the location of amplifiers in the optical network 10 according to the second embodiment of the invention. Upon start 601, the procedure 600 determines the allowable locations for amplifiers and DCMs in the network (step 602). Allowable locations for amplifiers are the same as described in the step 202 of the first embodiment of the invention. Allowable locations for DCMs are provided by DCM placement methods such as those disclosed in U.S. patent application to Ng et al. entitled "Method and System for Determining Location and Value of Dispersion Compensating Modules in an Optical Network", Ser. No. 10/273,858 filed on 21 Oct. 2002, and U.S. patent application to Ng, entitled "Method for Determining Optimal Location and Value of Dispersion Compensating Modules in an Optical Network", filed concurrently herewith and claiming priority from the U.S. Provisional Patent Application to Ng entitled "Optimum Method for Determining Location and Value of Dispersion Compensation Module (DCM) in an Optical Network", Ser. No. 60/402,563 filed on 10 Aug. 2002. These DCM placement methods provide multiple DCM locations that are considered equivalent by the DCM placement methods.

After determining the allowable locations, the method 600 randomly generates sets of amplifier and DCM locations (step 604), each set being generated by randomly choosing amplifier and DCM locations from among the allowable locations determined in the step 602.

The method 600 then applies genetic operations to the sets of amplifier and DCM locations generated in the step 604, similarly to the step 204 of the first embodiment of the invention, resulting in genetically evolved sets of amplifier and DCM locations.

Then, genetically evolved sets of amplifier and DCM locations are eliminated (step 608) by the application of an elimination criteria. This step includes the assignment of a value to each set of genetically evolved sets of amplifier and DCM locations. The assigned value is defined as in the step 208 of the first embodiment of the invention, with the modification that all values calculated pertain to the network that includes DCMs at the selected set of DCM locations.

In the step 610, the procedure 600 checks whether a predetermined exit condition has been satisfied, similarly to the step 210 of the first embodiment of the invention. If the predetermined exit condition has been satisfied (exit "Yes" from the step 610), then the method 600 proceeds to the step 612 of selecting the set of amplifier locations that satisfies a selection criteria, and the method 600 is finished (step 699). If the predetermined exit condition has not been satisfied (exit "No" from the step 610), then the method 600 returns to the step 606 of applying genetic operations.

Thus, a method for determining the locations and gain settings of optical amplifiers in an optical network is provided which takes into account and determines the placement of dispersion compensation modules, thereby potentially improving network operating margin or decreasing the number of amplifier locations.

It is apparent to those skilled in the art that there are many variations of the present invention that retain the spirit of the invention. Thus it is intended that the present invention cover the modifications, variations, and adaptations of this invention provided they fall within the scope of the following claims.

What is claimed is:

1. A method for determining the location of one or more amplifiers in an optical network, comprising the steps of:
   (a) determining allowable locations for amplifiers in a network;
   (b) randomly generating sets of amplifier locations for the network, each set being generated by randomly choosing amplifier locations from among said allowable locations, comprising applying a random binary value to each allowable amplifier location;
   (c) applying genetic operations to said sets of randomly generated amplifier locations, the genetic operations resulting in genetically evolved sets of amplifier locations;
   (d) eliminating genetically evolved sets of amplifier locations by applying an elimination criteria;
   (e) repeating steps (c) to (d) until a predetermined exit condition is satisfied; and
   (f) selecting a set of amplifier locations out of the sets of amplifier locations remaining in the step (e), which satisfies a selection criteria.

2. A method as described in claim 1, wherein the step of applying genetic operations includes the steps of:
   reproducing identical copies of the sets of amplifier locations (reproduction);
   exchanging subsets of different sets of amplifier locations (crossover); and
   randomly adding and removing amplifier locations in the sets of amplifier locations (mutation).

3. A method as described in claim 1, wherein the step of eliminating comprises assigning a value to each set of the genetically evolved sets of amplifier locations.

4. A method as described in claim 3, wherein the step of eliminating comprises eliminating those genetically evolved sets of amplifier locations that have lowest assigned values.

5. A method as described in claim 3, wherein the step of assigning a value to each set of the genetically evolved sets of amplifier locations comprises the steps of:
   (g) selecting a set of amplifier locations from among the sets of genetically evolved sets of amplifier locations;
   (h) determining if desired network operating conditions can be met by adjusting network and amplifier parameters in the network having amplifiers at the selected set of amplifier locations;
   (j) assigning the value for said selected set of amplifier locations, the value depending on the network and amplifier parameters and on the result of determining if the desired network operating conditions can be met; and
   (k) repeating the steps (g) to (j) a number of times.

6. A method as described in claim 5, wherein the step (h) of determining network and amplifier parameters comprises determining signal powers in the network and gain settings for said amplifiers such that the powers of signals on different wavelengths at said amplifiers are equal.

7. A method as described in claim 5, wherein the step (j) of assigning the value comprises calculating the value so as to be equal to a function of one or more of the following:
   the number of lightpaths in the network having amplifiers at locations specified in the step (g) that meet predetermined specifications, wherein a lightpath is a route from a transmitter to a receiver;
   the number of amplifier locations in said selected set of amplifier locations specified in the step (g);
   the effective margin of said selected set of amplifier locations, the effective margin being an available operating margin in the network having amplifiers in said selected set of amplifier locations, the operating margin in the network being a difference between an operating value of a selected network parameter and a threshold-value of said parameter for the network; and a value representing whether the desired network operating conditions can be met as determined in the step (h).

8. A method as described in claim 7, wherein the step of calculating the assigned value comprises defining the predetermined specifications of the lightpaths to be one or more of the following:

a minimum optical signal to noise ratio (OSNR);
a minimum signal power level; and
a maximum signal error rate.

9. A method as described in claim 7, wherein the step of calculating the assigned value comprises determining the effective margin as a function of one of the following:

an optical signal to noise ratio (OSNR) margin ($OSNR_{margin}$);
a power margin ($P_{rx\ margin}$); and
the optical signal to noise ratio (OSNR) margin ($OSNR_{margin}$) and the power margin ($P_{rx\ margin}$).

10. A method as described in claim 9, wherein the step of calculating the assigned value comprises determining the effective margin as being equal to $\sqrt{(P_{Rxmargin})^2 + (OSNR_{margin})^2}$.

11. A method as described in claim 1, wherein the step (e) of repeating comprises determining the predetermined exit condition as the state in which a percentage of the genetically evolved sets of amplifier locations are the same.

12. A method as described in claim 3, wherein the step (f) of selecting a set of amplifier locations comprises selecting the set of amplifier locations having the largest assigned value.

13. A method as described in claim 1, wherein the step (a) of determining allowable locations comprises determining allowable locations for amplifiers in the network, which includes protection lightpaths and reconfigurable lightpaths.

14. A method for determining the location of one or more amplifiers in an optical network, comprising the steps of:

(a) determining allowable locations for amplifiers and dispersion compensation modules (DCMs) in a network;

(b) randomly generating sets of amplifier and DCM locations for the network, each set being generated by randomly choosing amplifier and DCM locations from among said allowable locations;

(c) applying genetic operations to said sets of randomly generated amplifier and DCM locations, the genetic operations resulting in genetically evolved sets of amplifier and DCM locations;

(d) eliminating genetically evolved sets of amplifier and DCM locations by applying an elimination criteria;

(e) repeating steps (c) to (d) until a predetermined exit condition is satisfied; and (f) selecting a set of amplifier and DCM locations out of the sets of amplifier and DCM locations remaining in the step (e), which satisfies selection criteria.

* * * * *